(12) United States Patent
Shepard et al.

(10) Patent No.: US 11,747,453 B1
(45) Date of Patent: Sep. 5, 2023

(54) CALIBRATION SYSTEM FOR LIGHT DETECTION AND RANGING (LIDAR) DEVICES

(71) Applicant: Waymo LLC, Mountain View, CA (US)

(72) Inventors: Ralph H. Shepard, Menlo Park, CA (US); Pierre-Yves Droz, Los Altos, CA (US); Caner Onal, Palo Alto, CA (US); Hui Son, Hayward, CA (US)

(73) Assignee: Waymo LLC, Mountain View, CA (US)

( * ) Notice: Subject to any disclaimer, the term of this patent is extended or adjusted under 35 U.S.C. 154(b) by 525 days.

(21) Appl. No.: 16/822,481

(22) Filed: Mar. 18, 2020

Related U.S. Application Data

(60) Provisional application No. 62/930,009, filed on Nov. 4, 2019.

(51) Int. Cl.
  *G01S 17/88* (2006.01)
  *G01S 17/00* (2020.01)
  (Continued)

(52) U.S. Cl.
  CPC ............ *G01S 7/497* (2013.01); *G01S 7/4913* (2013.01); *G01S 17/08* (2013.01)

(58) Field of Classification Search
  USPC .......................... 356/3, 3.02, 3.3, 3.15, 4.02
  See application file for complete search history.

(56) References Cited

U.S. PATENT DOCUMENTS 3,158,861 A   11/1964  Iribe
3,897,997 A    8/1975  Kalt
(Continued)

FOREIGN PATENT DOCUMENTS

CN   103064076 B   6/2014
CN   204331026 U   5/2015
(Continued)

OTHER PUBLICATIONS

"Automatic Camera and Range Sensor Calibration using a single Shot"; Andreas Geiger, et al.; 2012 IEEE International Conference on Robotics and Automation (May 2012).
(Continued)

*Primary Examiner* — Daquan Zhao
(74) *Attorney, Agent, or Firm* — McDonnell Boehnen Hulbert & Berghoff LLP

(57) ABSTRACT

Example embodiments relate to calibration systems for light detection and ranging (lidar) devices. An example calibration system includes a calibration target that includes a surface having at least one characterized reflectivity. The surface is configured to receive one or more calibration signals emitted by a lidar device along one or more optical axes when the lidar device is separated from the calibration target by an adjustable distance. The calibration system also includes at least one lens that modifies the one or more calibration signals. In addition, the system includes an adjustable attenuator configured to attenuate each of the one or more calibration signals to simulate, in combination with the at least one lens, a distance that is greater than the adjustable distance. Further, the system includes a calibration controller configured to analyze data associated with detected reflections of the one or more calibration signals.

20 Claims, 10 Drawing Sheets

(51) Int. Cl.
  *G01S 17/02* (2020.01)
  *G01S 17/08* (2006.01)
  *G01S 7/497* (2006.01)
  *G01S 7/4913* (2020.01)
  *G01S 17/06* (2006.01)

(56) References Cited

U.S. PATENT DOCUMENTS

| | | |
|---|---|---|
| 4,314,249 A | 2/1982 | Onoe |
| 4,621,265 A | 11/1986 | Buse et al. |
| 5,282,014 A | 1/1994 | Ruhl, Jr. et al. |
| 5,294,935 A | 3/1994 | Bauerle |
| 5,606,409 A | 2/1997 | Schneiter |
| 6,061,015 A | 5/2000 | Sugimoto |
| 6,114,985 A | 9/2000 | Russell et al. |
| 6,310,682 B1 | 10/2001 | Gavish et al. |
| 6,552,829 B1 | 4/2003 | Maciey et al. |
| 6,596,996 B1 | 7/2003 | Stone et al. |
| 6,915,228 B2 | 7/2005 | Uffenkamp et al. |
| 7,619,746 B2 | 11/2009 | De Lega |
| 8,958,057 B2 | 2/2015 | Kane et al. |
| 9,046,600 B2 | 6/2015 | James |
| 9,343,815 B2 | 5/2016 | Watts |
| 9,874,441 B1 | 1/2018 | Hines et al. |
| 10,084,967 B1 | 9/2018 | Somasundaram et al. |
| 10,176,596 B1 | 1/2019 | Mou |
| 10,852,731 B1 | 12/2020 | Braley et al. |
| 10,928,490 B2 | 2/2021 | Tatipamula et al. |
| 11,392,124 B1 | 7/2022 | Braley et al. |
| 2001/0012985 A1 | 8/2001 | Okamoto et al. |
| 2008/0031514 A1 | 2/2008 | Kakinami |
| 2009/0228204 A1 | 9/2009 | Zavoli et al. |
| 2010/0076709 A1 | 3/2010 | Hukkeri et al. |
| 2010/0157280 A1 | 6/2010 | Kusevic et al. |
| 2010/0235129 A1 | 9/2010 | Sharma et al. |
| 2010/0299063 A1 | 11/2010 | Nakamura et al. |
| 2012/0038903 A1 | 2/2012 | Weimer et al. |
| 2013/0325252 A1 | 12/2013 | Schommer et al. |
| 2014/0014829 A1 | 1/2014 | Barber et al. |
| 2014/0152971 A1 | 6/2014 | James |
| 2014/0285676 A1 | 9/2014 | Barreto et al. |
| 2015/0039157 A1 | 2/2015 | Wolfe et al. |
| 2015/0055117 A1 | 2/2015 | Pennecot et al. |
| 2015/0149088 A1 | 5/2015 | Attard et al. |
| 2016/0116592 A1 | 4/2016 | Hiromi et al. |
| 2016/0161610 A1 | 6/2016 | Hiromi |
| 2017/0124781 A1 | 5/2017 | Douillard et al. |
| 2017/0280135 A1 | 9/2017 | Shroff et al. |
| 2017/0307876 A1 | 10/2017 | Dussan et al. |
| 2018/0188361 A1 | 7/2018 | Berger et al. |
| 2018/0189601 A1 | 7/2018 | Dabeer et al. |
| 2018/0284222 A1 | 10/2018 | Garrec et al. |
| 2018/0284275 A1 | 10/2018 | LaChapelle |
| 2018/0307245 A1 | 10/2018 | Khawaja et al. |
| 2018/0313940 A1 | 11/2018 | Wu et al. |
| 2019/0049242 A1 | 2/2019 | Adams et al. |
| 2019/0049311 A1 | 2/2019 | Barber |
| 2019/0049566 A1 | 2/2019 | Adams et al. |
| 2019/0104295 A1 | 4/2019 | Wendel et al. |
| 2019/0120947 A1 | 4/2019 | Wheeler |
| 2019/0187249 A1 | 6/2019 | Harmer et al. |
| 2019/0204425 A1 | 7/2019 | Abari et al. |
| 2019/0249985 A1 | 8/2019 | Steiff et al. |
| 2019/0258251 A1 | 8/2019 | Ditty et al. |
| 2019/0258899 A1 | 8/2019 | Coogan et al. |
| 2019/0331482 A1 | 10/2019 | Lawrence et al. |
| 2019/0392610 A1 | 12/2019 | Cantadori et al. |
| 2020/0191943 A1 | 6/2020 | Wu et al. |
| 2020/0249354 A1* | 8/2020 | Yeruhami ............. B60S 1/02 |
| 2020/0284887 A1 | 9/2020 | Wachter et al. |

FOREIGN PATENT DOCUMENTS

| | | |
|---|---|---|
| CN | 107688185 A | 2/2018 |
| CN | 108415003 A | 8/2018 |
| JP | H07128438 A | 5/1995 |
| JP | H10020035 A | 1/1998 |
| JP | 2000509150 A | 7/2000 |
| JP | 2006258690 A | 9/2006 |
| JP | 2007147333 A | 6/2007 |
| JP | 2007225342 A | 9/2007 |
| JP | 2009544023 A | 12/2009 |
| JP | 2011514709 A | 5/2011 |
| JP | 2017032355 A | 2/2017 |
| JP | 2018505427 A | 2/2018 |

OTHER PUBLICATIONS

"A Wide Dynamic Range CMOS Laser Radar Receiver With a Time-Domain Walk Error Compensation Scheme"; S. Kurtti, et al.; IEEE Transactions on Circuits and Systems—I: Regular Papers, vol. 64, No. 3 (Dec. 1, 2016).

"A High-Sensitivity and Low-Walk Error LADAR Receiver for Military Application"; Hongsoo Cho; IEEE Transactions on Circuits and Systems I: Regular Papers, vol. 61, No. 10 (Sep. 18, 2014).

"A Novel Multi-Planar LIDAR and Computer Vision Calibration Procedure Using 2D Patterns for Automated Navigation"; Lili Huang, et al.; 2009 IEEE Intelligent Vehicles Symposium (Jun. 3-5, 2009).

"Airborne Altimetric LiDAR: Principle, Data collection, processing and Applications"; Bharat Lohani; stored on web.archive.org as early as Sep. 9, 2007 (2007).

"Radiometric Calibration of Terrestrial Laser Scanners with External Reference Targets"; Sanna Kaasalainen, et al.; Remote Sensing 2009, 1, 144-158 (Jul. 3, 2009).

"3D LIDAR-Camera Extrinsic Calibration Using an Arbitrary Trihedron"; Xiaojin Gong, et al.; Sensors 2013, 13, 1902-1918 (Feb. 1, 2013).

"Sensorfusion Using Spatio-Temporal Aligned Video and Lidar for Improved Vehicle Detection"; Mirko Mahlisch et al.; Intelligent Vehicles Symposium 2006 (Jun. 13-15, 2006).

Abstract of "A Correction Method for Range Walk Error in Photon Counting 3D Imaging LIDAR," Sciencedirect.com, Optics Communications, vol. 308, pp. 211-217 (Nov. 1, 2013).

Huikari, Jaakko, Sahba Jahromi, Jussi-Pekka Jansson, and Juha Kostamovaara. "A laser radar based on a "impulse-like" laser diode transmitter and a 2D SPAD/TDC receiver." In 2017 IEEE International Instrumentation and Measurement Technology Conference (I2MTC), pp. 1-6. IEEE, 2017.

International Search Report and Written Opinion for International Application No. PCT/US2020/019283.

* cited by examiner

CALIBRATION SYSTEM FOR LIGHT DETECTION AND RANGING (LIDAR) DEVICES

CROSS-REFERENCE TO RELATED APPLICATIONS

The present application claims priority to Provisional Patent Application No. 62/930,009, filed with the U.S. Patent and Trademark Office on Nov. 4, 2019, the contents of which are hereby incorporated by reference.

BACKGROUND

Unless otherwise indicated herein, the materials described in this section are not prior art to the claims in this application and are not admitted to be prior art by inclusion in this section.

Light detection and ranging (lidar) devices may estimate distances to objects in a given environment. For example, an emitter subsystem of a lidar device may emit near-infrared light pulses, which may interact with objects in the device's environment. At least a portion of the light pulses may be redirected back toward the lidar (e.g., due to reflection or scattering) and detected by a detector subsystem. Conventional detector subsystems may include a plurality of detectors and a corresponding controller configured to determine an arrival time of the respective light pulses with high temporal resolution (e.g., —400 ps). The distance between the lidar device and a given object may be determined based on a time of flight of the corresponding light pulses that interact with the given object.

SUMMARY

The disclosure relates to calibration systems for lidar devices. An example calibration system includes a calibration target, one or more lenses, an adjustable attenuator, and a calibration controller. The calibration target may be separated from the lidar device by an adjustable distance. When undergoing calibration, a lidar device may transmit calibration signals through the one or more lenses and the adjustable attenuator toward the calibration target. The calibration signals may then be reflected by the calibration target, which may have one or more characterized reflectivities. Thereafter, the lidar device may detect the reflections. Because of the one or more lenses and the adjustable attenuator, distances between the lidar device and the calibration target greater than the adjustable distance may be simulated, thereby allowing for calibration of longer distances without requiring a physically larger calibration setup. The calibration controller is configured to analyze the reflections detected by the lidar device and the simulated distance to calibrate the lidar device.

In one aspect, a lidar calibration system is provided. The lidar calibration system includes a calibration target that includes a surface having at least one characterized reflectivity. The surface is configured to receive one or more calibration signals emitted by a light detection and ranging (lidar) device along one or more optical axes when the lidar device is separated from the calibration target by an adjustable distance. The lidar calibration system also includes at least one lens positioned along the one or more optical axes to modify the one or more calibration signals. Further, the lidar calibration system includes an adjustable attenuator positioned along the one or more optical axes. The adjustable attenuator is configured to attenuate each of the one or more calibration signals to simulate, in combination with the at least one lens, a distance that is greater than the adjustable distance. In addition, the lidar calibration system includes a calibration controller configured to analyze data associated with detected reflections of the one or more calibration signals based on the at least one characterized reflectivity, the adjustable distance, and characteristics of the at least one lens.

In another aspect, a method is provided. The method includes emitting, by a light detection and ranging (lidar) device, one or more calibration signals along one or more optical axes toward a surface of a calibration target. The surface of the calibration target has at least one characterized reflectivity. The calibration target is separated from the lidar device by an adjustable distance. The method also includes simulating a distance that is greater than the adjustable distance. The simulating includes attenuating, by an adjustable attenuator positioned along the one or more optical axes, the one or more calibration signals. The simulating also includes modifying, by at least one lens positioned along the one or more optical axes, the one or more calibration signals. Further, the method includes reflecting, by the calibration target, the one or more calibration signals. In addition, the method includes detecting, by the lidar device, reflections of the one or more calibration signals. Still further, the method includes analyzing, using a calibration controller, data associated with the detected reflections of the one or more calibration signals based on the at least one characterized reflectivity, the adjustable distance, and characteristics of the at least one lens.

In an additional aspect, a system is provided. The system includes a light detection and ranging (lidar) device configured to emit and detect calibration signals. The system also includes a calibration target that includes a surface having at least one characterized reflectivity. The calibration target is separated from the lidar by an adjustable distance. The surface of the calibration target is configured to receive one or more calibration signals emitted by the lidar device along the one or more optical axes. In addition, the system includes at least one lens positioned along the one or more optical axes to modify the one or more calibration signals. Further, the system includes an adjustable attenuator positioned along the one or more optical axes. The adjustable attenuator is configured to attenuate each of the one or more calibration signals to simulate, in combination with the at least one lens, a distance that is greater than the adjustable distance. Additionally, the system includes a calibration controller configured to analyze data associated with the one or more calibration signals based on the at least one characterized reflectivity, the adjustable distance, and characteristics of the at least one lens.

In a further aspect, a method is provided. The method includes emitting, by a light detection and ranging (lidar) device, a light signal into a surrounding environment. The method also includes detecting, by the lidar device, a reflection of the light signal from one or more objects in the surrounding environment. Further, the method includes determining, based on the detected reflection of the light signal and a lookup table, a reflectivity of the one or more objects in the surrounding environment. The lookup table is generated by emitting, by the lidar device, one or more calibration signals along one or more optical axes toward a surface of a calibration target. The surface of the calibration target has at least one characterized reflectivity. The calibration target is separated from the lidar device by an adjustable distance. The lookup table is also generated by simulating a distance that is greater than the adjustable distance. The simulating includes attenuating, by an adjustable attenuator positioned along the one or more optical axes, the one or more calibration signals. The simulating also includes modifying, by at least one lens positioned along the one or more optical axes, the one or more calibration signals. Further, the lookup table is generated by reflecting, by the calibration target, the one or more calibration signals. In addition, the lookup table is generated by reflecting, by the calibration target, the one or more calibration signals. Still further, the lookup table is generated by detecting, by the lidar device, reflections of the one or more calibration signals. Even further, the lookup table is generated by analyzing, using a calibration controller, data associated with the detected reflections of the one or more calibration signals based on the at least one characterized reflectivity, the adjustable distance, and characteristics of the at least one lens.

These as well as other aspects, advantages, and alternatives will become apparent to those of ordinary skill in the art by reading the following detailed description, with reference, where appropriate, to the accompanying drawings.

DETAILED DESCRIPTION

Figure 1:
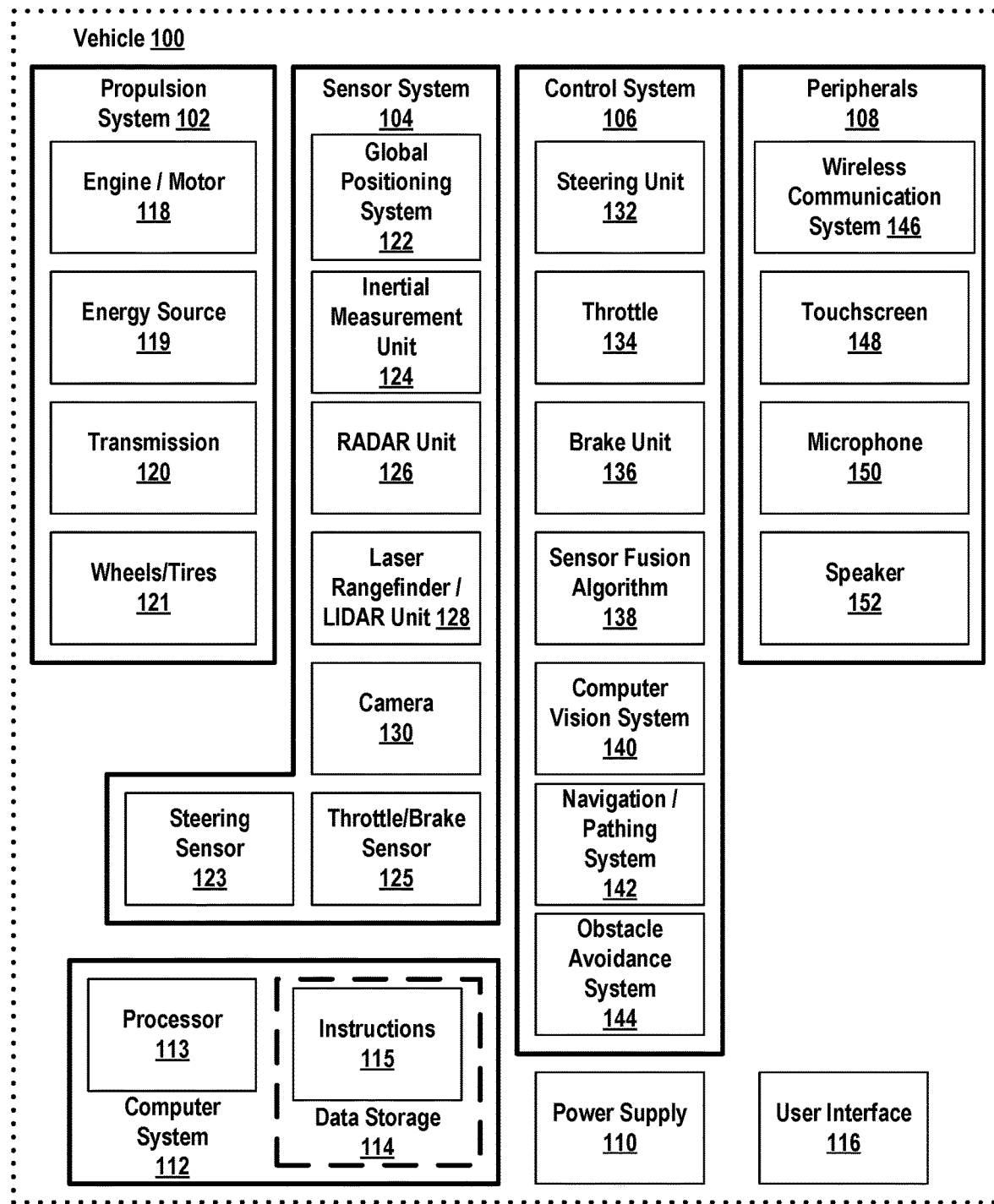
FIG. 1 is a functional block diagram illustrating a vehicle, according to example embodiments.
Figure 2A:
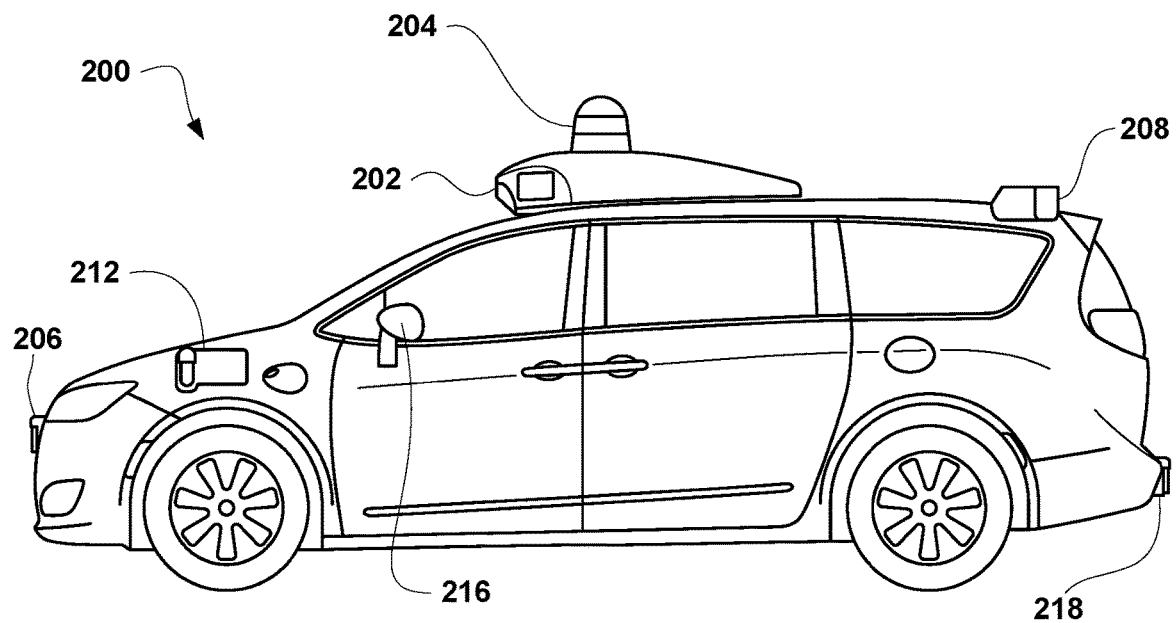
FIG. 2A is an illustration of a physical configuration of a vehicle, according to example embodiments.
Figure 2B:
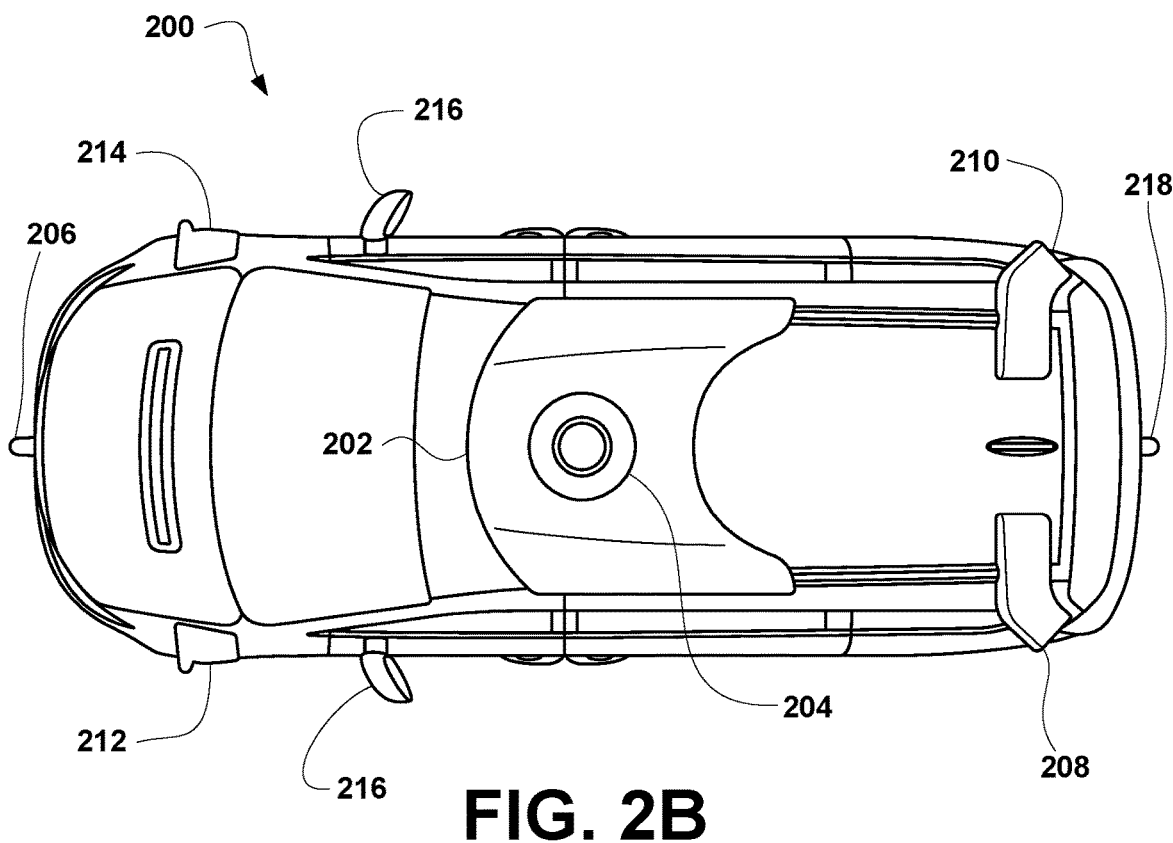
FIG. 2B is an illustration of a physical configuration of a vehicle, according to example embodiments.
Figure 2C:
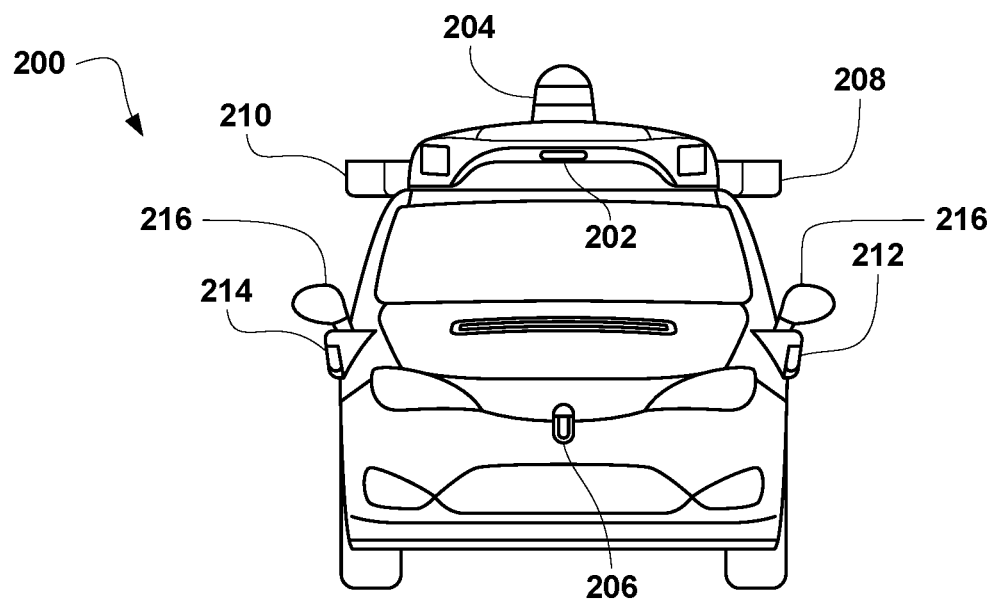
FIG. 2C is an illustration of a physical configuration of a vehicle, according to example embodiments.
Figure 2D:
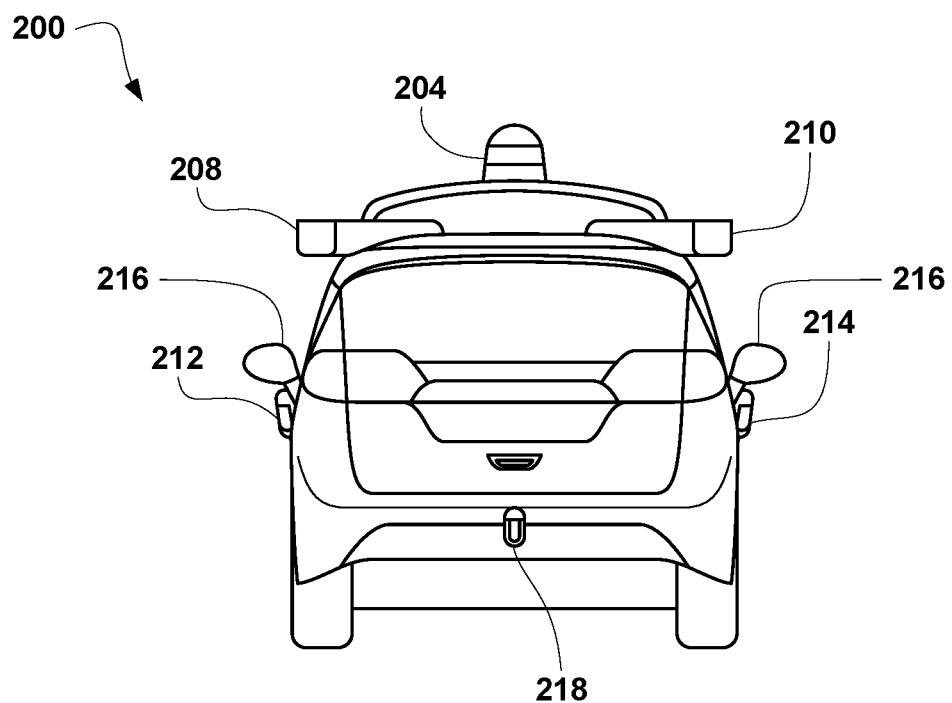
FIG. 2D is an illustration of a physical configuration of a vehicle, according to example embodiments.
Figure 2E:
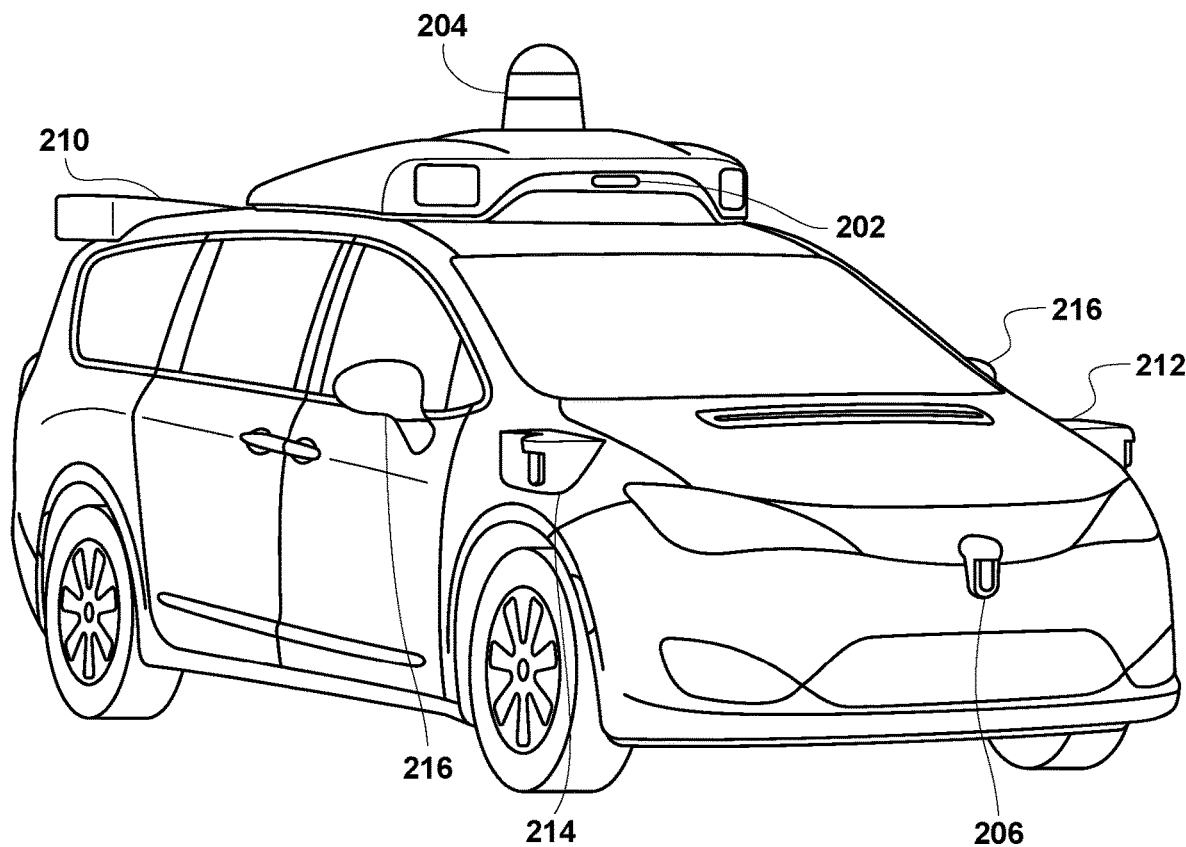
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

I. Overview

Lidar devices (e.g., lidar devices for use in object detection and avoidance for an autonomous vehicle) may determine the range to a given object in a surrounding environment by determining the time of flight of a light signal. The transmitted light signal may be a light pulse (e.g., emitted from a pulsed laser source). Determining time of flight of the corresponding light pulses may include determining a time difference between the time when the light pulse is emitted from the lidar device and the receive time when a reflection of the light pulse from an object is detected by the lidar device.

In addition to determining distances to a given object in a surrounding environment, lidar devices may make determinations about the reflectivity of objects. Determined reflectivities of objects can assist in object identification (e.g., by identifying the surface profile of the object and/or the color of the object). Hence, more accurate reflectivity measurements can lead to more accurate object identification. In order to enhance this accuracy, a lidar device may be calibrated.

One technique for calibrating a lidar device may include positioning a calibration target at a predetermined distance relative to the lidar device. Once the calibration target is in position, one or more calibration signals may be emitted from light emitters of the lidar device toward the calibration target. Then, the one or more calibration signals may reflect from the calibration target and be detected by detectors of the lidar device. A calibration controller may then compare a known reflectivity of the calibration target to the apparent reflectivity of the calibration target (e.g., as detected by the lidar device). Any discrepancies can be stored as offsets that could be used in runtime (e.g., a plot of apparent reflectivity offset vs. distance between the lidar device and the target could be generated and stored in a lookup table that could be used to determine actual reflectivities based on apparent reflectivities and ranges in runtime). A separate set of offsets may be generated for each light emitter and/or detector in the lidar device (e.g., for each light emitter/detector pair in lidar devices with corresponding arrays of light emitters and detectors). Further, interpolation, extrapolation, and/or regression techniques may be used to generate the sets of offsets. Additionally or alternatively, the lidar device and/or the calibration target may be placed on stage(s) configured to translate and/or rotate such that multiple distances and/or perspectives can be calibrated.

One potential challenge with the calibration technique described above is calibrating for long distances. Calibrating for long distances naturally calls for large separations between the lidar device and the calibration target (e.g., in order to calibrate for runtime detections at ranges of 200 meters, a 200 meter separation between the lidar device and the calibration target would be used). However, sometimes unobstructed areas of such a scale are impractical. For example, obtaining a large warehouse that is almost entirely empty and solely used for calibration can be costly.

Embodiments described herein remedy such an issue by simulating distances for calibration that are larger than the actual separation between the calibration target and the lidar device. One example embodiment includes a calibration target separated from the lidar device undergoing calibration by an adjustable distance. However, rather than simply firing calibration signals at the calibration target and detecting returns, one or more lenses and an adjustable attenuator are interposed between the lidar device and the calibration target during calibration. The one or more lenses may have focal lengths such that they behave similar to a collimation lens, for example. Further, the variable attenuator may reduce the power of the emitted calibration signals prior to the calibration returns being detected by the lidar device. Due to the arrangement of lenses, the apparent distance to the calibration target from the perspective of the lidar device is greater than the actual distance to the calibration target from the perspective of the lidar device. Similarly, due to the variable attenuator, the intensity of calibration returns is less than would otherwise be the case for a calibration target at the adjustable distance. As such, the combination of the one or more lenses and the adjustable attenuator allow for calibration of returns from seemingly greater distances than the physical separation between the calibration target and the lidar device, which can allow for space conservation in a calibration setup.

In some embodiments, the calibration target and/or the arrangement of one or more lenses and the lidar device may be attached to one or more stages. The stage(s) may be configured to translate and/or rotate the calibration target relative to the lidar device so as to allow for calibration of various perspectives of the calibration target relative to the lidar device and/or various simulated distances between the calibration target and the lidar device. Further, the calibration target may have a surface with a characterized reflectivity. Such a characterized reflectivity may be used when the calibration controller is performing calibration of the lidar device. Further, the surface may include multiple regions having different characterized reflectivities such that, when used in tandem with the adjustable attenuator, a number of different intensities of calibration signals can be calibrated.

II. Example Systems

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as GPS 122, inertial measurement unit (IMU) 124, radar 126, laser rangefinder/lidar 128, camera 130, steering sensor 123, and throttle/brake sensor 125, among other possible sensors. In some embodiments, sensor system 104 may also include sensors configured to monitor internal systems of the vehicle 100 (e.g., 02 monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/lidar 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/lidar 128 may include one or more photodetectors. Such photodetectors may be especially sensitive detectors (e.g., avalanche photodiodes (APDs)). In some examples, such photodetectors may be capable of detecting single photons (e.g., SPADs). Further, such photodetectors can be arranged (e.g., through an electrical connection in series) into an array (e.g., as in a SiPM). In some examples, the one or more photodetectors are Geiger-mode operated devices and the lidar includes subcomponents designed for such Geiger-mode operation.

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 that can include some or all of the functions described in connection with vehicle 100 in reference to FIG. 1. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first lidar unit 204, a second lidar unit 206, a first radar unit 208, a second radar unit 210, a first lidar/radar unit 212, a second lidar/radar unit 214, and two additional locations 216, 218 at which a radar unit, lidar unit, laser rangefinder unit, and/or other type of sensor or sensor(s) could be located on the vehicle 200. Each of the first lidar/radar unit 212 and the second lidar/radar unit 214 can take the form of a lidar unit, a radar unit, or both.

Furthermore, the example vehicle 200 can include any of the components described in connection with vehicle 100 of FIG. 1. The first and second radar units 208, 210 and/or the first and second lidar units 204, 206 can actively scan the surrounding environment for the presence of potential obstacles and can be similar to the radar 126 and/or laser rangefinder/lidar 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, lidars, range finders, inertial sensors, humidity sensors, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths and/or elevations. The sensor unit 202 could be mounted atop the roof of a car, although other mounting locations are possible.

Additionally, the sensors of sensor unit 202 could be distributed in different locations and need not be collocated in a single location. Some possible sensor types and mounting locations include the two additional locations 216, 218.

Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first lidar/radar unit 212 and the second lidar/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
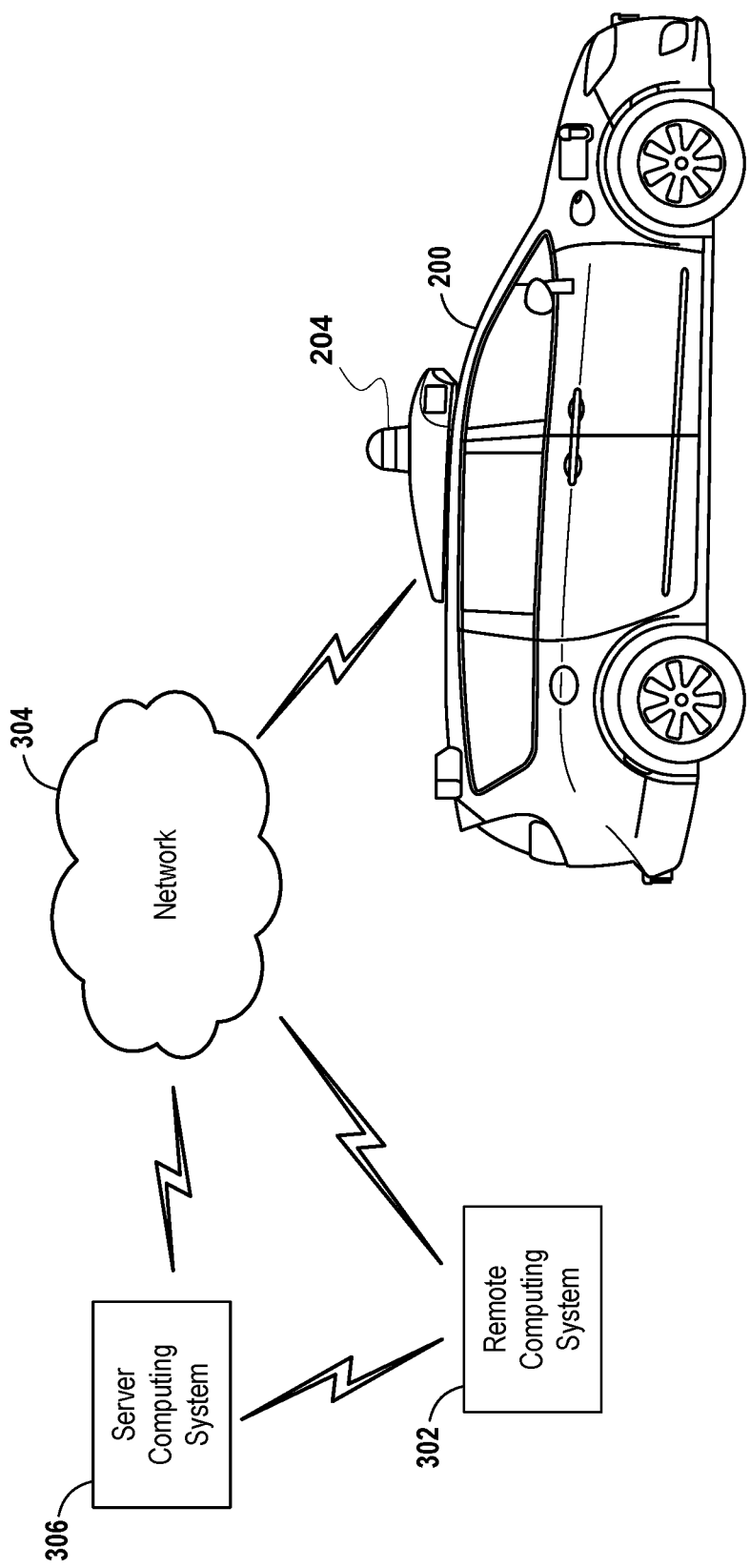
FIG. 3 is a conceptual illustration of wireless communication between various computing systems related to an autonomous vehicle, according to example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source) that will be reflected by target objects near the vehicle. The laser range finder may be able to capture the reflected electromagnetic (e.g., laser) signals. The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the environment of the vehicle. For example, the processing system may combine data from both radar information and a captured image to determine if another vehicle or pedestrian is in front of the autonomous vehicle. In other embodiments, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and be image or video data. In other embodiments, the environment data may come from a lidar unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the environment, it may also calculate a confidence associated with the specific detected object. The confidence may be calculated in various ways depending on the embodiment. In one example, when detecting objects of the environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4A:
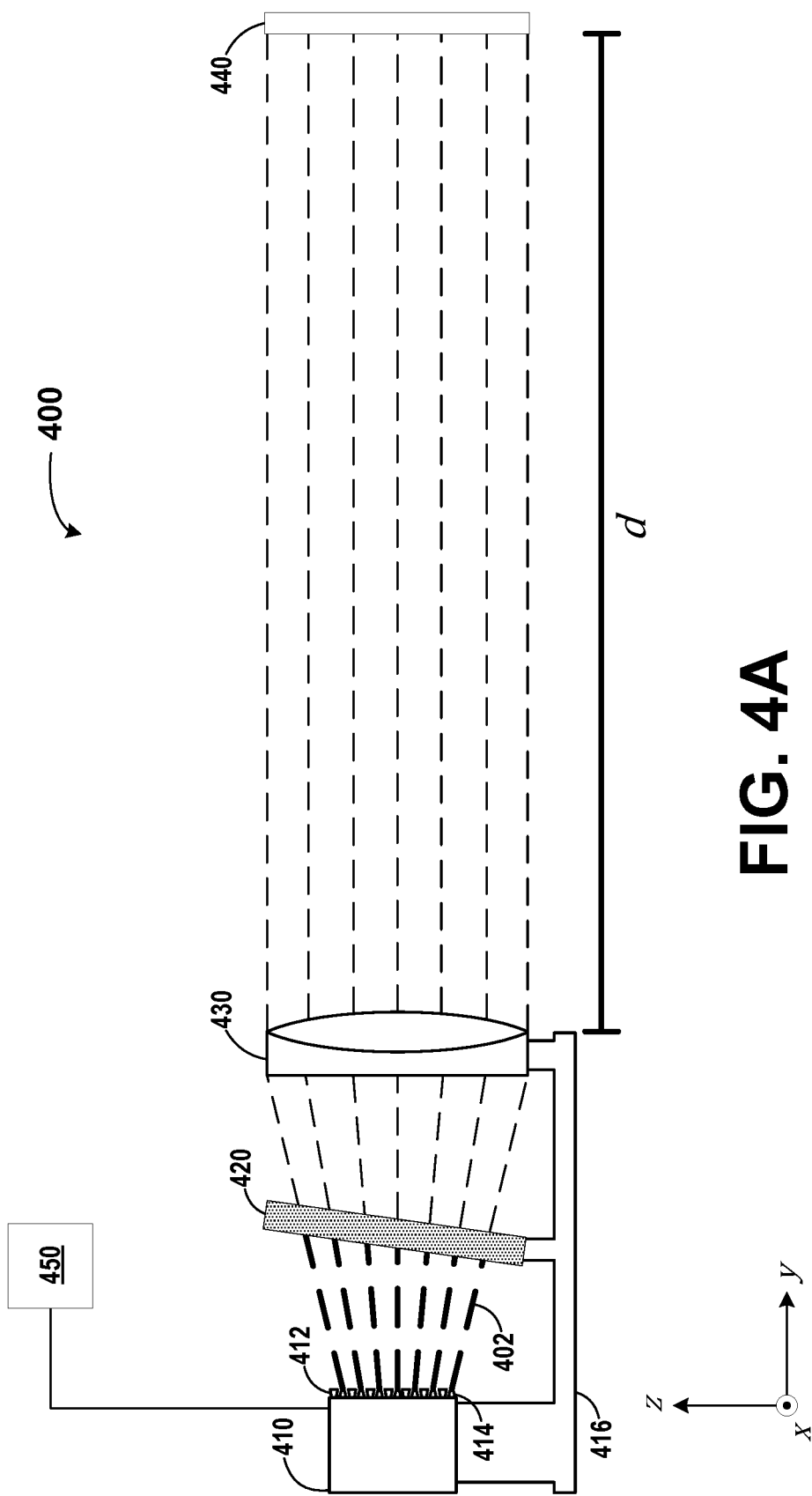
FIG. 4A is an illustration of a calibration system, according to example embodiments.

Illustrated in FIG. 4A is a calibration system 400 from a side-view perspective. The calibration system may include a lidar device 410 (which may include detectors 412 and light emitters 414), a stage 416, an adjustable attenuator 420, one or more lenses 430, a calibration target 440, and a calibration controller 450.

The lidar device 410 may be a device configured to determine distances to objects in a surrounding environment. For example, the lidar device 410 may be used for object detection and avoidance within an autonomous vehicle (e.g., such as the laser rangefinder/lidar 128 illustrated in FIG. 1, the first lidar unit 204 illustrated in FIGS. 2A-2E, and/or the second lidar unit 206 illustrated in FIGS. 2A-2E). Distances to objects in a surrounding environment may be stored (e.g., within a non-transitory, computer-readable medium) in the form of a point cloud, in some embodiments.

The detectors 412 may include one or more photodetectors (e.g., silicon photomultipliers (SiPMs), avalanche photodiodes (APDs), single-photon avalanche diodes (SPADs), etc.). Further, the detectors 412 may be positioned within an array of the lidar device 410. The detectors 412 may be configured to detect light signals transmitted by the light emitters 414 and reflected from objects in an environment surrounding the lidar device 410.

The light emitters 414 may include light sources such as laser diodes. In some embodiments, the light emitters 414 may include pulsed light sources. For example, the light sources may include one or more pulsed lasers (e.g., a Q-switched laser). In alternate embodiments, a continuous wave (CW) light source may instead be used. The light emitters 414 may be configured to emit light signals toward objects in a surrounding environment that, when reflected by such objects, can be detected by the detectors 412 to determine a distance between the lidar device 410 and the respective object. In some embodiments, each of the light emitters 414 may correspond to a single detector 412 in the lidar device 410. When placed in the calibration system 400, the light emitters 414 may be configured to emit calibration signals 402 along one or more optical axes, as illustrated in FIG. 4A. Further, in some embodiments, the light emitters 414 may be configured to emit the calibration signals 402 in a radial pattern and, correspondingly, the detectors 412 may be configured to detect the calibration signals 402 in the radial pattern.

The stage 416 may be a motorized stage (e.g., a tip/tilt stage and/or a translational stage). The stage 416 may be configured to rotate the lidar device 410, the adjustable attenuator 420, and the lens 430 in yaw, pitch, and/or roll directions. For example, the light emitters 414 may be configured to emit calibration signals 402 along the one or more optical axes as the stage 416 rotates. Additionally or alternatively, the stage 416 may be configured to linearly translate the lidar device 410, the adjustable attenuator 420, and the lens 430 relative to the calibration target 440 (e.g., in x, y, and/or z directions). For example, the stage 416 may move the lidar device 410, the adjustable attenuator 420, and the lens 430 so as to modify the adjustable distance d. In some embodiments, the stage 416 may be controlled by the calibration controller 450.

In alternate embodiments, other components may be attached to one or more stages, in addition to or instead of the lidar device 410, the adjustable attenuator 420, and the lens 430. For example, in some embodiments, only the calibration target 440 may be attached to a stage. In such embodiments, the calibration target 440 may instead translate and/or rotate relative the lidar device 410, the adjustable attenuator 420, and the lens 430. In still other embodiments, the lens 430 may be located in between the lidar device 410 and the adjustable attenuator 420. In such embodiments, the stage 416 may only be attached to the lidar device 410 and the lens 430. As such, the lidar device 410 and the lens 430 may be translated and/or rotated by the stage 416 relative to the adjustable attenuator 420 and the calibration target 440.

The adjustable attenuator 420 may include one or more filters (e.g., neutral-density filters or filters designed for wavelengths emitted by the light emitters 414) configured to reduce the intensity of the calibration signal(s) 402 transmitted by the light emitters 414 of the lidar device 410. By reducing the intensity of the calibration signal(s) 402 using the adjustable attenuator 420, the decay of the calibration signals 402 that would occur at long ranges can be simulated, thereby allowing for simulation of longer target ranges. The adjustable attenuator 420 may be adjusted so as to simulate different amounts of attenuation of the calibration signal(s) 402, thereby allowing for simulation of differing target reflectivities. For example, the adjustable attenuator 420 may attenuate the intensities of the calibration signal(s) 402 by 0%, then by 1%, then by 2%, then by 3%, then by 4%, etc., up to 100%. In alternate embodiments, the attenuation pattern may be more or less granular. Additionally or alternatively, in alternate embodiments, the attenuation pattern may start at maximum attenuation (e.g., 100% attenuation) and then decrease. Due to the series of attenuations, the intensity of the calibration signal(s) 402 will vary over a range of intensities. In conjunction with varying the adjustable distance d, a series of calibration data points can be generated and stored (e.g., in a lookup table).

In alternate embodiments, the adjustable attenuator 420 could be located at other locations within the calibration system 400. For example, in some embodiments, the adjustable attenuator 420 may be integrated into the lidar device 410. Alternatively, the adjustable attenuator 420 may be positioned along the optical axes of the calibration signals 402 after the lens 430.

In some embodiments, the adjustable attenuator 420 may include a continuously variable attenuator. For example, the adjustable attenuator 420 may include a rotating polarizer, a photochromic device, a liquid-crystal device, or a louver-style device. In other embodiments, the adjustable attenuator 420 may include one or more interchangeable filters. Such interchangeable filters may be cascadable, in some embodiments, in order to produce a greater range of possible attenuations. For example, such interchangeable filters, in combination with the various reflectivities of the surface of the calibration target 440, may together provide a dynamic range of detectable intensities for calibration of at least $10^4$. In other embodiments, other dynamic ranges of detectable intensities may be provided for calibration (e.g., $10^2$, $10^3$, $10^5$, $10^6$, $10^7$, $10^8$, $10^9$, $10^{10}$, etc.).

The lens 430 may be configured to adjust the calibration signals so as to simulate a greater distance between the lens 430 and the calibration target 440 than the adjustable distance d. By simulating a greater distance between the lens 430 and the calibration target 440, a greater distance between the lidar device 410 and the calibration target 440 is also simulated. In some embodiments, the lens 430 may include a collimation lens or a lens with a large focal length (e.g., a lens having a focal length between approximately 25.0 meters and approximately 75.0 meters). In other embodiments, the lens 430 may include a lens with a smaller focal length (e.g., between approximately 20.0 meters and approximately 30.0 meters, between approximately 10.0 meters and approximately 20.0 meters, between approximately 5.0 meters and approximately 10.0 meters, between approximately 3.0 meters and approximately 9.0 meters, between approximately 1.0 meters and approximately 5.0 meters, or less than approximately 1.0 meters). Accordingly, the lens may have a focal length of as short as 1 m, a focal length of approximately 5 m, or a focal length of approximately 15 m, for example. In some embodiments, the lens 430 may be replaced by a series of lenses (e.g., a series of cascaded lenses).

The calibration target 440 may be separated from the lens 430 by an adjustable distance d, as illustrated in FIG. 4A. The adjustable distance d may be altered during calibration (e.g., by moving the lidar device 410, the adjustable attenuator 420, and the lens 430 relative to the calibration target 440 or vice versa). In some embodiments, the adjustable distance d may be varied between 0 meters and 15 meters during calibration (e.g., at 1 cm increments). The calibration target 440 may reflect the calibration signals 402 such that the calibration signals 402 from the lidar device 410 can be detected by the lidar device 410.

In some embodiments, the calibration target 440 may include a surface that has at least one characterized reflectivity. For example, the calibration target 440 may have one or more regions (e.g., between 5 and 10 regions) that have different predetermined characterized reflectivities (e.g., six regions each with a different reflectivity for wavelengths corresponding to the calibration signal 402). In some embodiments, one or more of the reflective regions of the surface of the calibration target 440 may be panels attached to a frame that defines a perimeter of the calibration target 440. In other embodiments, one or more of the regions with predetermined reflectivities may be overlays mounted on a flat backing panel (e.g., a slab of glass or other transmissive material). In some embodiments, one or more of the reflective regions of the surface of the calibration target 440 and/or other components of the calibration target 440 may be surrounded (e.g., around the perimeter of the respective reflective region or component) by a low-reflectivity material (e.g., black gaffer tape) to prevent high-intensity returns from being generated (e.g., to maintain a wide range of usable reflectivities for calibration). This may be particularly useful at the mounting locations (e.g., where one or more of the reflective regions are adhered to a metallic frame and/or backing panel of the calibration target 440). In some embodiments, the reflective regions of the calibration target 440 may have different shapes and/or sizes than one another. For example, some embodiments of the calibration target 440 may include a small retroreflective region, or be a successive series of targets, one of which may be a small retroreflector. Because retroreflective regions result in high-intensity returns, they can result in an enhanced amount of crosstalk between detection channels within the lidar device 410. As such, retroreflective regions can be useful in identifying undesirable crosstalk. For example, a small retroreflector could be used to evaluate crosstalk between channels of the lidar device 410. For instance, a single light emitter among an array of light emitters of the lidar device 410 may emit light toward the retroreflective region/retroreflector. If no crosstalk occurs within the lidar device 410, only the light detector corresponding to that particular light emitter would detect a reflection from the retroreflective region. However, if crosstalk is present, multiple detectors may detect returns from the single light signal.

A map of the predetermined reflectivities of the surface of the calibration target 440 may be stored within a data storage (e.g., a non-transitory, computer-readable medium of the calibration controller 450), such that the calibration controller 450 may use the predetermined reflectivities when determining offsets based on the simulated distances and apparent distances identified during calibration of the lidar device 410 (i.e., when calibrating the lidar device 410). The predetermined reflectivities of the regions of the surface of the calibration target 440 may also serve to reduce the intensity of calibration signals 402 reflected from the calibration target 440, thereby simulating attenuation of the calibration signals 402, which can be used to simulate longer distances between the lidar device 410 and the calibration target 440 (e.g., simulate distances greater than the actual distance between the lidar device 410 and the calibration target 440). Further, the predetermined reflectivities of the regions of the surface of the calibration target 440 may be used to simulate different objects that have different inherent reflectivities. So that each light emitter 414 and detector 412 combination in the lidar device 410 may access each of the different regions of the surface of the calibration target 440 with different predetermined reflectivities, the lidar device 410 may be rotated relative to the calibration target 440 during calibration, or vice versa.

The calibration controller 450 may be configured to perform operations, such as operations described below with respect to FIG. 5. As such, the calibration controller 450 may include at least one processor (e.g., a microprocessor or an application-specific integrated circuit (ASIC)) operable to execute instructions stored in a non-transitory, computer-readable medium. In some embodiments, the calibration controller 450 may also represent a plurality of computing devices that may serve to control individual components or subsystems of a vehicle in a distributed fashion.

In some embodiments, a data storage of the calibration controller 450 may contain instructions (e.g., program logic) executable by a processor of the calibration controller 450 to execute various calibration functions. The data storage may contain additional instructions as well, including instructions to control one or more of a propulsion system, a sensor system, or peripherals of a vehicle (e.g., an autonomous vehicle).

The calibration controller 450 may be configured to analyze data associated with detected reflections of the one or more calibration signals 402 based on the characterized reflectivity of the calibration target 440, the adjustable distance d, and characteristics of the lens 430 (e.g., a back focal length of the lens 430). By analyzing such data, the calibration controller 450 may be configured to determine any offset between a measured reflectivity and an actual reflectivity present in the calibration setup. Determining the offset may also include determining the offset based on the distance being simulated by the calibration system 400. Such an offset can be stored for later use in runtime (e.g., in a lookup table) to ensure reflectivities determined by the lidar device 410 are accurate. For example, a pair of values may be stored in a lookup table for use during run-time. The first value may correspond to the apparent reflectivity of the object in the surrounding environment, determined by the lidar device 410, and the second value may be the actual reflectivity of the object in the surrounding environment. There may be a pair of values in the lookup table for multiple distances to the objects in the surrounding environment (e.g., as determined using multiple simulated distances using the calibration system 400).

In some embodiments, a series of calibration measurements may be made, resulting in a series of offsets being determined by the calibration controller 450. In such embodiments, the series of offsets may be stored in a lookup table. Additionally or alternatively, the series of offsets may be stored in a calibration curve (e.g., within a non-transitory, computer-readable medium). The calibration curve may relate the reflectivity offset detected by the lidar device 410 to the distance between the lidar device 410 and the target in the surrounding environment. Determining such a calibration curve may include applying interpolation, extrapolation, and/or regression techniques. In some embodiments, the calibration curve may be non-linear. Further, in some embodiments, multiple calibration curves may be generated and stored for use in runtime. For example, a separate calibration curve may be generated for each pair of detectors 412/light emitters 414.

Figure 4B:
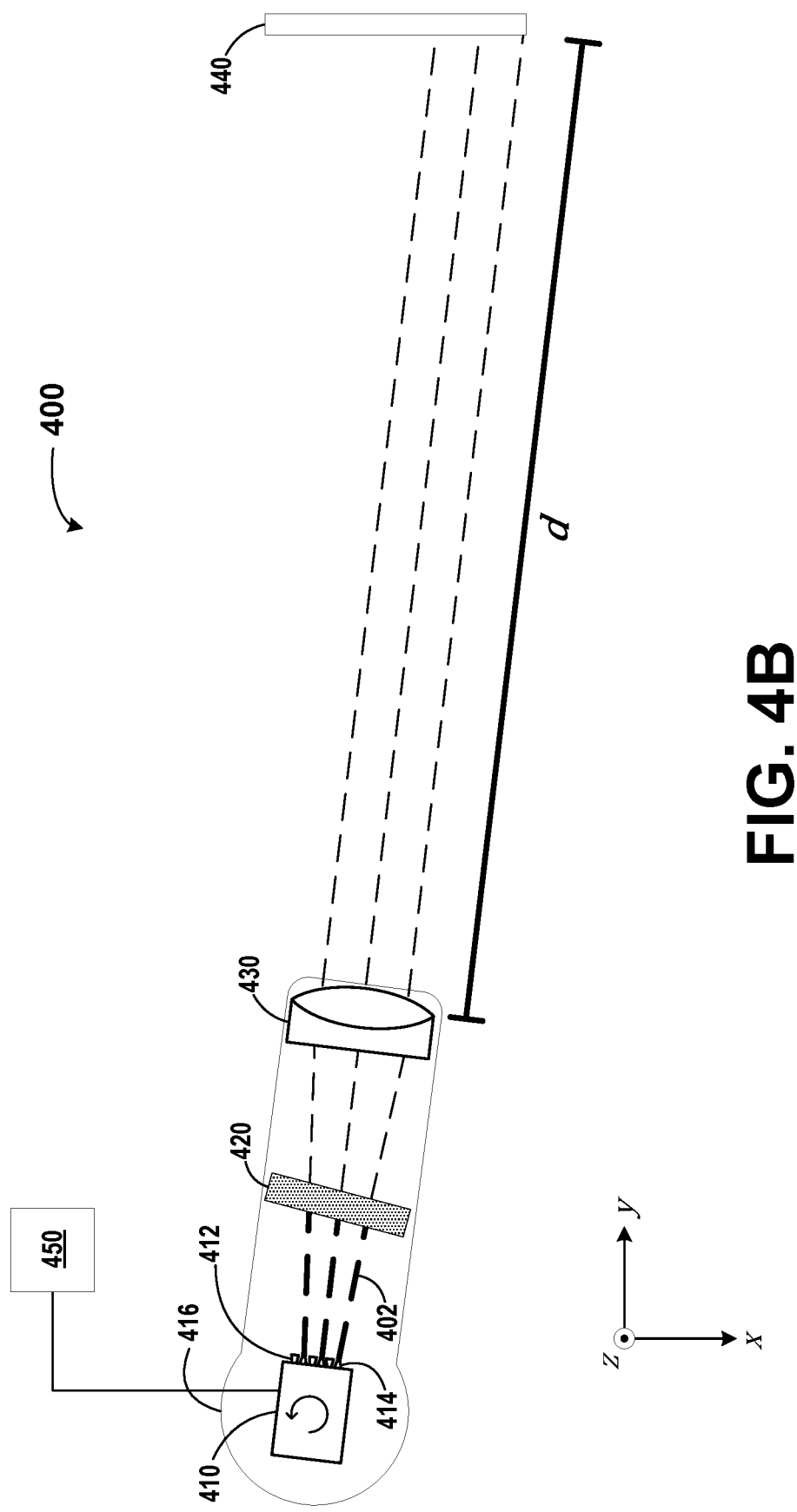
FIG. 4B is an illustration of a calibration system, according to example embodiments.
Figure 4C:
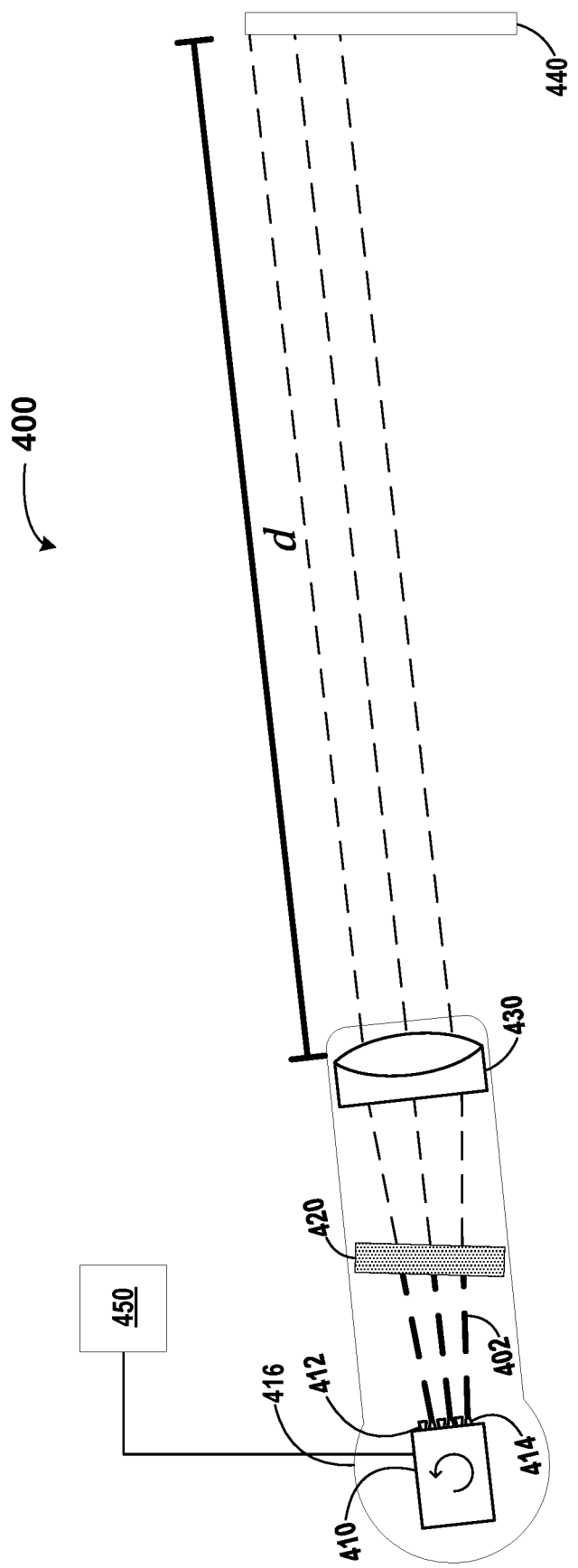
FIG. 4C is an illustration of a calibration system, according to example embodiments.

Generating a series of calibration measurements may include translating and/or rotating the lidar device 410 and the lens 430 relative to the calibration target 440. This could be done by adjusting the orientation or location of the stage 416 illustrated in FIG. 4A. For example, rotating the stage 416 as illustrated from a top-view perspective in FIGS. 4B and 4C could result in a different perspective of the lidar device 410 relative to the calibration target 440. Depending on the way in which the reflectivity of the surface of the calibration target 440 varies, differing perspectives of the lidar device 410 relative to the calibration target 440 may correspond to different simulated distances and target reflectivities to the calibration target 440.

Additionally or alternatively, the stage 416 could be translated toward or away from the calibration target 440, thereby changing the adjustable distance d. After translating and/or rotating the lidar device 410 (e.g., and the adjustable attenuator 420 and lens 430) relative to the calibration target 440, an additional calibration measurement may be performed (e.g., the light emitters 414 may emit additional calibration signals 402 that are reflected from the calibration target 440 and detected by the detectors 412). The additional calibration measurement may also be analyzed by the calibration controller 450. In this way, multiple perspectives and/or simulated distances may be calibrated for the lidar device 410.

In some embodiments, the calibration system 400 may also include one or more background light sources configured to simulate ambient lighting conditions. For example, the calibration system 400 may include one or more continuous wave (CW) illumination sources (e.g., a light-emitting diode (LED), an array of LEDs, or another broadband light source like a halogen lamp) that illuminate the calibration target 440 (e.g., from behind the calibration target 440, from behind the lidar device 410, the sides of the calibration target 440, and/or from in-between the calibration target 440 and the lidar device 410) to simulate sunlight. In some embodiments, background light sources may emit light across a spectrum of wavelengths that includes the one or more wavelengths emitted by the light emitters 414 of the lidar device 410.

Further, such background light sources may include one or more associated optics to improvement simulation of lighting conditions. For example, background light sources may include one or more diffusers that uniformly diffuse the light from the background light sources across the calibration target 440. Even further, the intensity of the background light sources may be modulated using one or more attenuators. For example, the intensity of the background light sources may be dynamically adjusted by an adjustable attenuator similar to the adjustable attenuator 420 illustrated in FIGS. 4A-4C. Using the one or more background light sources, the lidar device 410 can be calibrated using the calibration target 440 for varying background light levels (i.e., varying levels of background noise). Based on the one or more background light sources, one or more calibration measurements may be made to provide a maximum target range for a given solar background intensity (e.g., maximum range at 100,000 lux of solar load).

III. Example Processes

Figure 5:
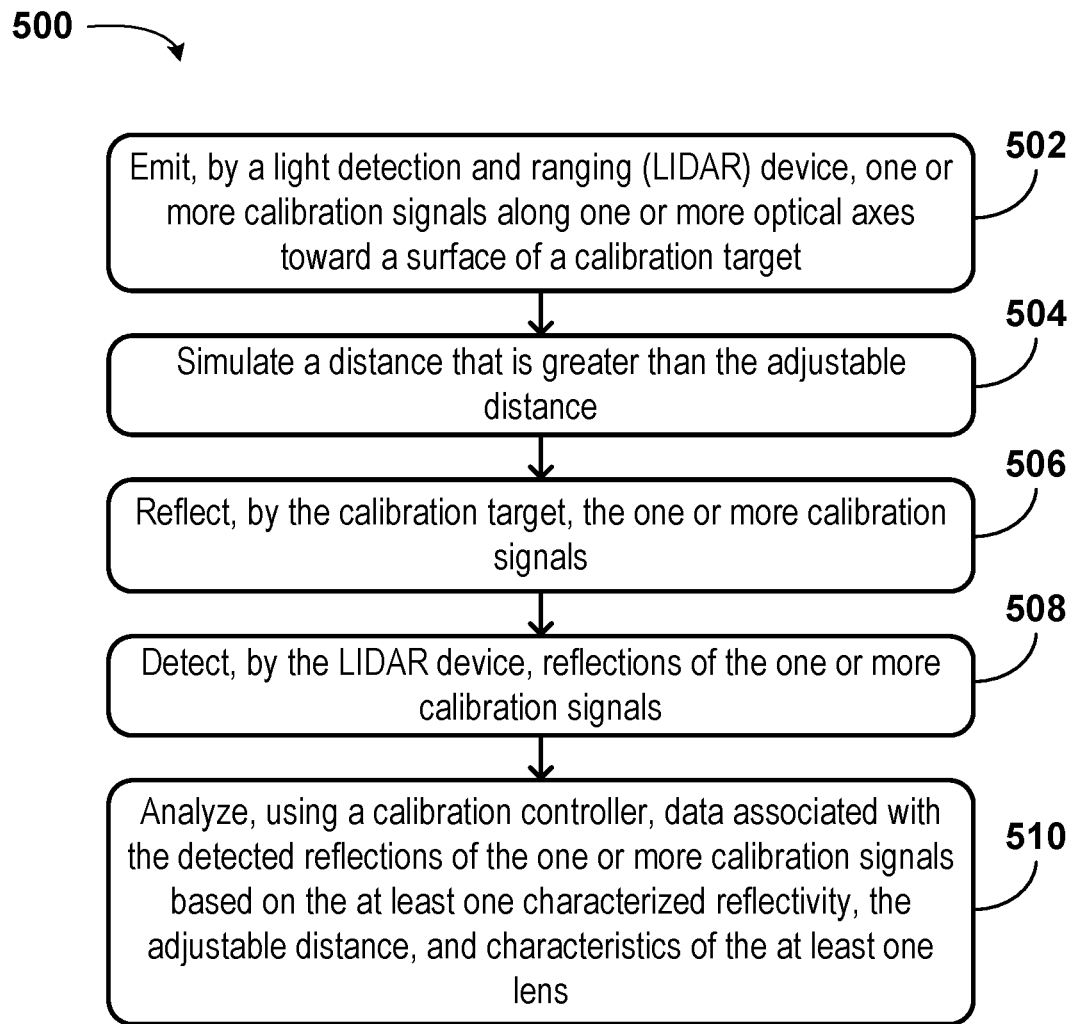
FIG. 5 is an illustration of a method, according to example embodiments.

FIG. 5 is a flowchart diagram of a method 500, according to example embodiments.

At block 502, the method 500 may include emitting, by a light detection and ranging (lidar) device, one or more calibration signals along one or more optical axes toward a surface of a calibration target. The surface of the calibration target may have at least one characterized reflectivity. The calibration target may be separated from the lidar device by an adjustable distance.

At block 504, the method 500 may include simulating a distance that is greater than the adjustable distance. Simulating the distance that is greater than the adjustable distance may include attenuating, by an adjustable attenuator positioned along the one or more optical axes, the one or more calibration signals. Simulating the distance that is greater than the adjustable distance may also include modifying, by at least one lens positioned along the one or more optical axes, the one or more calibration signals.

At block 506, the method 500 may include reflecting, by the calibration target, the one or more calibration signals.

At block 508, the method 500 may include detecting, by the lidar device, reflections of the one or more calibration signals.

At block 510, the method 500 may include analyzing, using a calibration controller, data associated with the detected reflections of the one or more calibration signals based on the at least one characterized reflectivity, the adjustable distance, and characteristics of the at least one lens.

In some embodiments, the method 500 may also include causing a stage to rotate or translate the lidar device relative to the calibration target.

Figure 6:
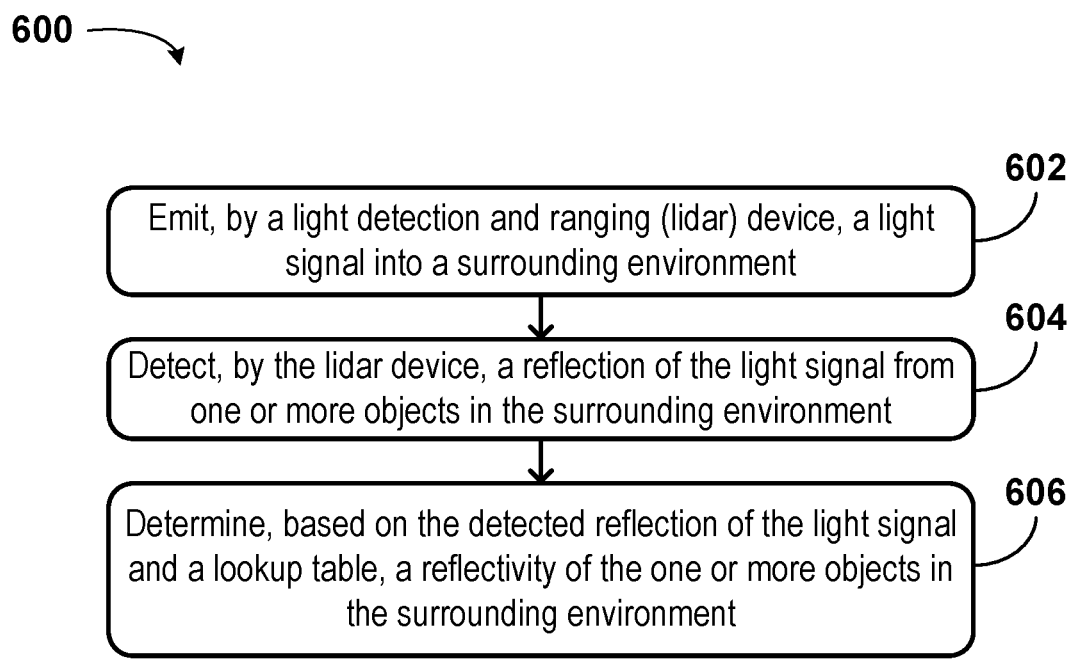
FIG. 6 is an illustration of a method, according to example embodiments.

FIG. 6 is a flowchart diagram of a method 600, according to example embodiments.

At block 602, the method 600 may include emitting, by a light detection and ranging (lidar) device, a light signal into a surrounding environment.

At block 604, the method 600 may include detecting, by the lidar device, a reflection of the light signal from one or more objects in the surrounding environment.

At block 606, the method 600 may include determining, based on the detected reflection of the light signal and a lookup table, a reflectivity of the one or more objects in the surrounding environment. The lookup table may be generated by emitting, by the lidar device, one or more calibration signals along one or more optical axes toward a surface of a calibration target. The surface of the calibration target may have at least one characterized reflectivity. The calibration target may also be separated from the lidar device by an adjustable distance. The lookup table may also be generated by simulating a distance that is greater than the adjustable distance. Simulating such a distance may include attenuating, by an adjustable attenuator positioned along the one or more optical axes, the one or more calibration signals. Simulating such a distance may also include modifying, by at least one lens positioned along the one or more optical axes, the one or more calibration signals. Further, the lookup table may be generated by reflecting, by the calibration target, the one or more calibration signals. Additionally, the lookup table may be generated by detecting, by the lidar device, reflections of the one or more calibration signals. Still further, the lookup table may be generated by analyzing, using a calibration controller, data associated with the detected reflections of the one or more calibration signals based on the at least one characterized reflectivity, the adjustable distance, and characteristics of the at least one lens.

IV. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including random-access memory (RAM), a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A lidar calibration system, comprising:
a calibration target comprising a surface having at least one characterized reflectivity, wherein the surface is configured to receive one or more calibration signals emitted by a lidar device along one or more optical axes when the lidar device is separated from the calibration target by an adjustable distance;
at least one lens positioned along the one or more optical axes to modify the one or more calibration signals;
an adjustable attenuator positioned along the one or more optical axes, wherein the adjustable attenuator is configured to attenuate each of the one or more calibration signals to simulate, in combination with the at least one lens, a distance that is greater than the adjustable distance; and
a calibration controller configured to analyze data associated with detected reflections of the one or more calibration signals based on the at least one characterized reflectivity, the adjustable distance, and characteristics of the at least one lens.

2. The lidar calibration system of claim 1, wherein the adjustable attenuator comprises a continuously variable attenuator.

3. The lidar calibration system of claim 2, wherein the continuously variable attenuator comprises a rotating polarizer, a photochromic device, a liquid-crystal device, or a louver-style device.

4. The lidar calibration system of claim 1, wherein the adjustable attenuator comprises two or more interchangeable filters.

5. The lidar calibration system of claim 4, wherein the two or more interchangeable filters are cascadable.

6. The lidar calibration system of claim 1, wherein the at least one lens comprises a lens having a focal length between 10.0 meters and 20.0 meters.

7. The lidar calibration system of claim 1, wherein the at least one lens comprises a collimating lens.

8. The lidar calibration system of claim 1, further comprising a stage, wherein the stage is configured to rotate and translate the lidar device relative to the calibration target.

9. The lidar calibration system of claim 8, wherein the lidar device is configured to emit at least some of the one or more calibration signals sequentially as the stage rotates such that at least some of the one or more calibration signals are directed toward different regions of the surface of the calibration target.

10. The lidar calibration system of claim 9, wherein the different regions of the surface of the calibration target have different characterized reflectivities.

11. The lidar calibration system of claim 10, wherein the surface of the calibration target has between 5 and 10 regions having different characterized reflectivities.

12. The lidar calibration system of claim 8, wherein the lidar device is configured to emit at least some of the one or more calibration signals sequentially as the stage translates such that the data associated with the detected reflections of the one or more calibration signals comprises data associated with different values of the adjustable distance.

13. The lidar calibration system of claim 8, wherein an orientation or position of the stage is controlled by the calibration controller.

14. The lidar calibration system of claim 1, wherein the adjustable attenuator and the at least one characterized reflectivity of the surface of the calibration target together provide a dynamic range of detectable intensities for calibration of at least $10^4$.

15. The lidar calibration system of claim 1, wherein the adjustable attenuator is positioned between the at least one lens and the calibration target along the one or more optical axes.

16. The lidar calibration system of claim 1, wherein the at least one lens is positioned between the adjustable attenuator and the calibration target along the one or more optical axes.

17. The lidar system of claim 1, wherein the lidar device comprises:
an array of emitters configured to emit the one or more calibration signals in a radial pattern; and
an array of detectors configured to detect reflections of the one or more calibration signals from the surface of the calibration target, wherein each detector in the array of detectors corresponds to a respective emitter in the array of emitters.

18. A method comprising:
emitting, by a lidar device, one or more calibration signals along one or more optical axes toward a surface of a calibration target, wherein the surface of the calibration target has at least one characterized reflectivity, and wherein the calibration target is separated from the lidar device by an adjustable distance;
simulating a distance that is greater than the adjustable distance, wherein the simulating comprises: (i) attenuating, by an adjustable attenuator positioned along the one or more optical axes, the one or more calibration signals; and (ii) modifying, by at least one lens positioned along the one or more optical axes, the one or more calibration signals;
reflecting, by the calibration target, the one or more calibration signals;
detecting, by the lidar device, reflections of the one or more calibration signals; and
analyzing, using a calibration controller, data associated with the detected reflections of the one or more calibration signals based on the at least one characterized reflectivity, the adjustable distance, and characteristics of the at least one lens.

19. The method of claim 18, further comprising causing a stage to rotate or translate the lidar device relative to the calibration target.

20. A method comprising:
emitting, by a lidar device, a light signal into a surrounding environment;
detecting, by the lidar device, a reflection of the light signal from one or more objects in the surrounding environment; and
determining, based on the detected reflection of the light signal and a lookup table, a reflectivity of the one or more objects in the surrounding environment,
wherein the lookup table is generated by:
emitting, by the lidar device, one or more calibration signals along one or more optical axes toward a surface of a calibration target, wherein the surface of the calibration target has at least one characterized reflectivity, and wherein the calibration target is separated from the lidar device by an adjustable distance;
simulating a distance that is greater than the adjustable distance, wherein the simulating comprises: (i) attenuating, by an adjustable attenuator positioned along the one or more optical axes, the one or more calibration signals; and (ii) modifying, by at least one lens positioned along the one or more optical axes, the one or more calibration signals;
reflecting, by the calibration target, the one or more calibration signals;
detecting, by the lidar device, reflections of the one or more calibration signals; and
analyzing, using a calibration controller, data associated with the detected reflections of the one or more calibration signals based on the at least one characterized reflectivity, the adjustable distance, and characteristics of the at least one lens.

\* \* \* \* \*